Aug. 9, 1949.  R. A. CRITCHFIELD  2,478,807
SAWMILL WITH SWINGING WORK-CLEANING
AUXILIARY CUTTER
Filed Aug. 27, 1945  3 Sheets-Sheet 3
Fig. 3.
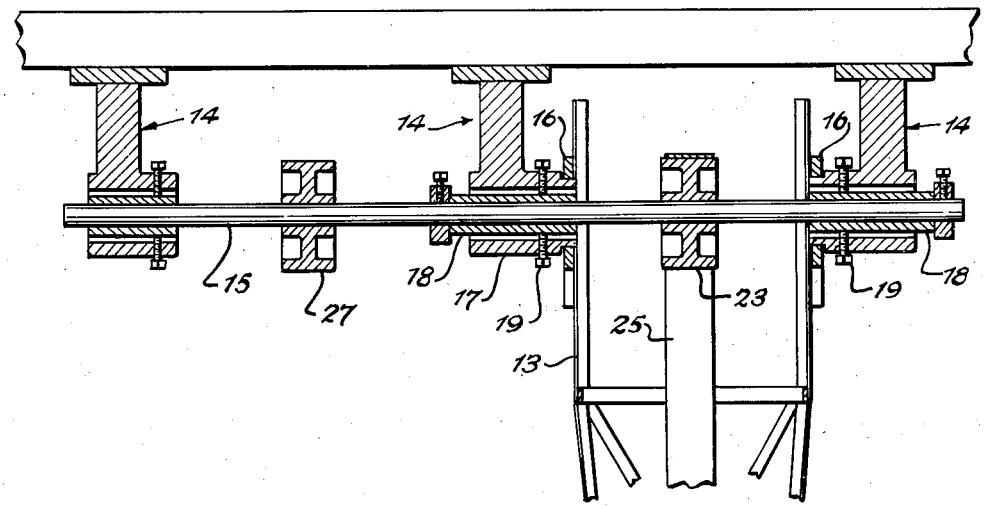
Fig. 5.
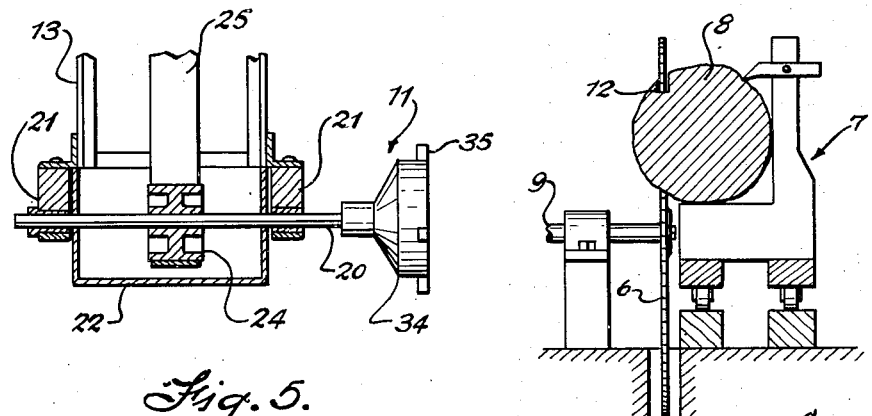
Fig. 4.
Inventor
Robert A. Critchfield.
By Clarence A. O'Brien
and Harvey B. Jacobson
Attorneys Patented Aug. 9, 1949

2,478,807

UNITED STATES PATENT OFFICE 2,478,807

SAWMILL WITH SWINGING WORK-CLEANING AUXILIARY CUTTER

Robert A. Critchfield, Neversink, N. Y.

Application August 27, 1945, Serial No. 612,834

2 Claims. (Cl. 144—1)

This invention relates to sawmills of the type employed to saw logs lengthwise into planks, and has more particular reference to a certain type of dirt and bark remover for use in connection with sawmills of the above kind.

In the operation of sawmills of the kind referred to above, it is a common practice to feed the logs to the saw with the bark thereon, and such bark is often filled with grit and dirt which rapidly wears and dulls the saw teeth. This necessarily entails frequent stoppage of the sawmill for sharpening and setting the saw teeth or substitution of a new saw.

The primary object of the present invention, therefore, is to provide means operating in advance of the saw to remove the bark and dirt from the log in advance of the saw and in the plane where the saw enters the log, so that frequent stopping of the mill will not be required for sharpening and setting the teeth of the saw or frequently renewing the latter.

A further object of the invention is to provide a dirt and bark remover of the above kind which is comparatively simple and durable in construction, efficient in operation, and easy to install and use.

More specific objects and features of the invention will become apparent from the following description when considered in connection with the accompanying drawings, in which—

Figure 3 is an enlarged fragmentary section taken on line 3—3 of Figure 2.

Figure 4 is a fragmentary vertical section taken on line 4—4 of Figure 2, and

Figure 5 is a fragmentary section taken on line 5—5 of Figure 2.

Figure 1:
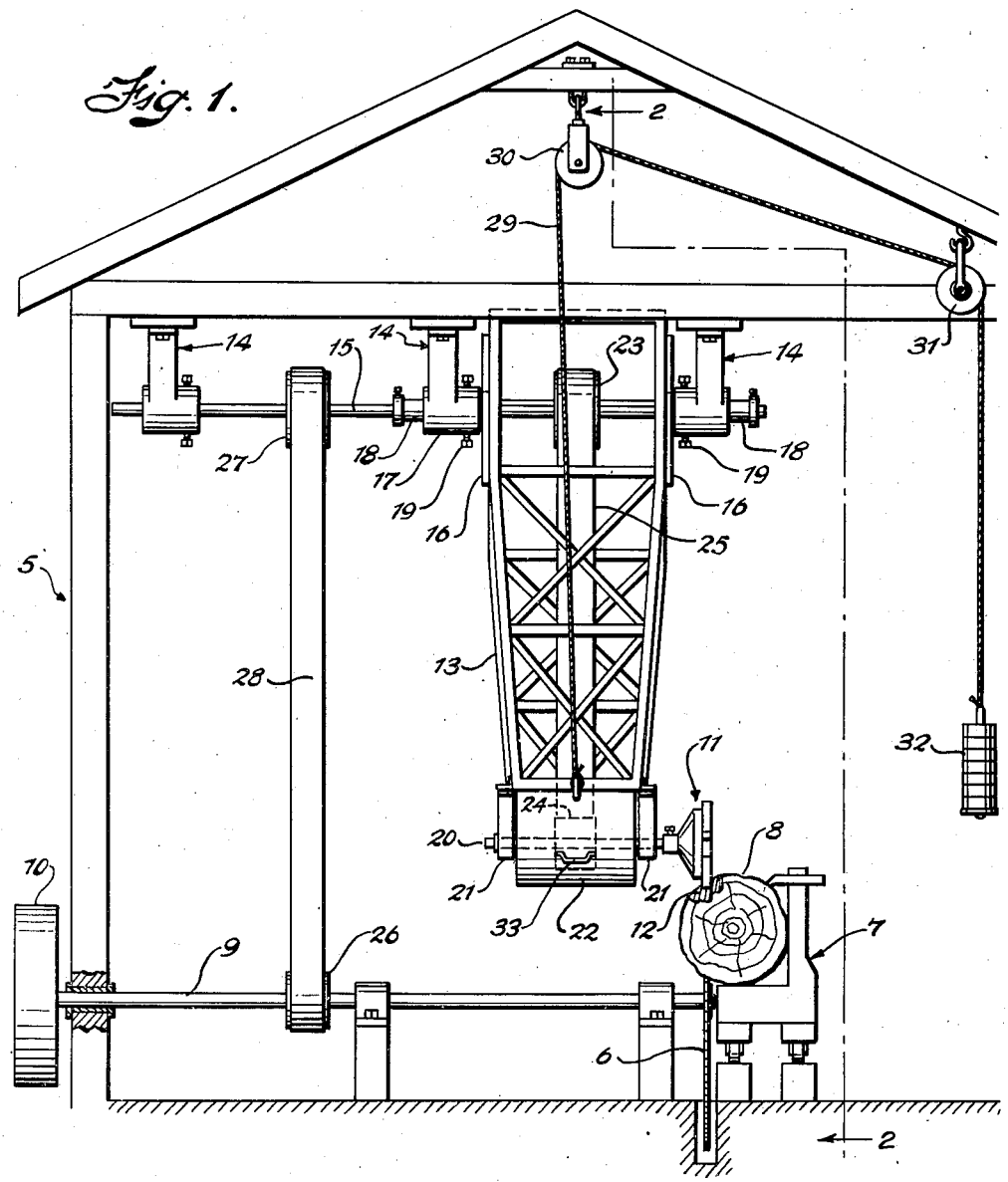
Figure 1 is a somewhat diagrammatic front elevational view of a sawmill equipped with a dirt and bark remover constructed in accordance with the present invention.

Referring in detail to the drawings, the preferred embodiment of the present invention is illustrated in connection with a conventional sawmill housed within a shed 5 and including a rotary circular saw 6 and a log carriage 7 movable to feed the log 8 lengthwise to the saw 6 for cutting said log longitudinally into planks. The saw 6 is carried by a transverse horizontal shaft 9 having a pulley 10 to which power is usually transmitted by means of a belt from a motor. The saw 6 is driven in the direction of the arrow in Figure 2 so as to enter the log at the top of the latter in the sawing operation.

As the log has the bark thereon and as such bark is usually filled with grit and dirt, the saw 6 becomes rapidly dulled and worn under previously existing conditions.

The present invention contemplates the provision of a routing cutter 11 arranged to operate in advance of and in line with the saw 6 to groove the top of the log longitudinally as at 12 and thereby remove dirt and bark from the log where the saw 6 enters the log in the sawing operation.

As shown, an elongated frame 13 is pivotally suspended at one end from adjacent ones of a plurality of overhead hangers 14 for a horizontal transverse counter shaft 15. As shown in Figure 3, the frame is journaled on the adjacent hangers so that the weight of the frame is taken by the latter and not by the shaft 15. For this purpose, the frame 13 has side plates 16 which are journaled on adjacent reduced ends of the tubular lower portions 17 of the hangers 14. The shaft 15 is journaled in floating bearings 18 provided in the tubular portions 17 of the hangers 14, said bearings being adjustable by means of set screws 19 so as to secure proper alignment of the bearings 18 and setting of shaft 15 parallel with the shaft 9 of the saw 6.

The routing cutter 11 is secured upon a projecting end of a transverse horizontal shaft 20 journaled in spaced bearings 21 secured to the lower end of frame 13 as shown in Figure 5. A trough-shaped guard 22 is disposed against the lower end of the frame 13 between the bearings 21 and has the shaft 20 extended therethrough. Secured on shaft 15 within the upper portion of frame 13 is a pulley 23, and secured on the shaft 20 within the guard 22 is another pulley 24. The pulleys 23 and 24 are aligned and have a belt 25 passed about the same so that driving of shaft 15 will cause driving of shaft 20 and the cutter 11 carried by the latter. The guard 22 prevents accidental contact of the attendant with the pulley 24 and belt 25.

Figure 2:
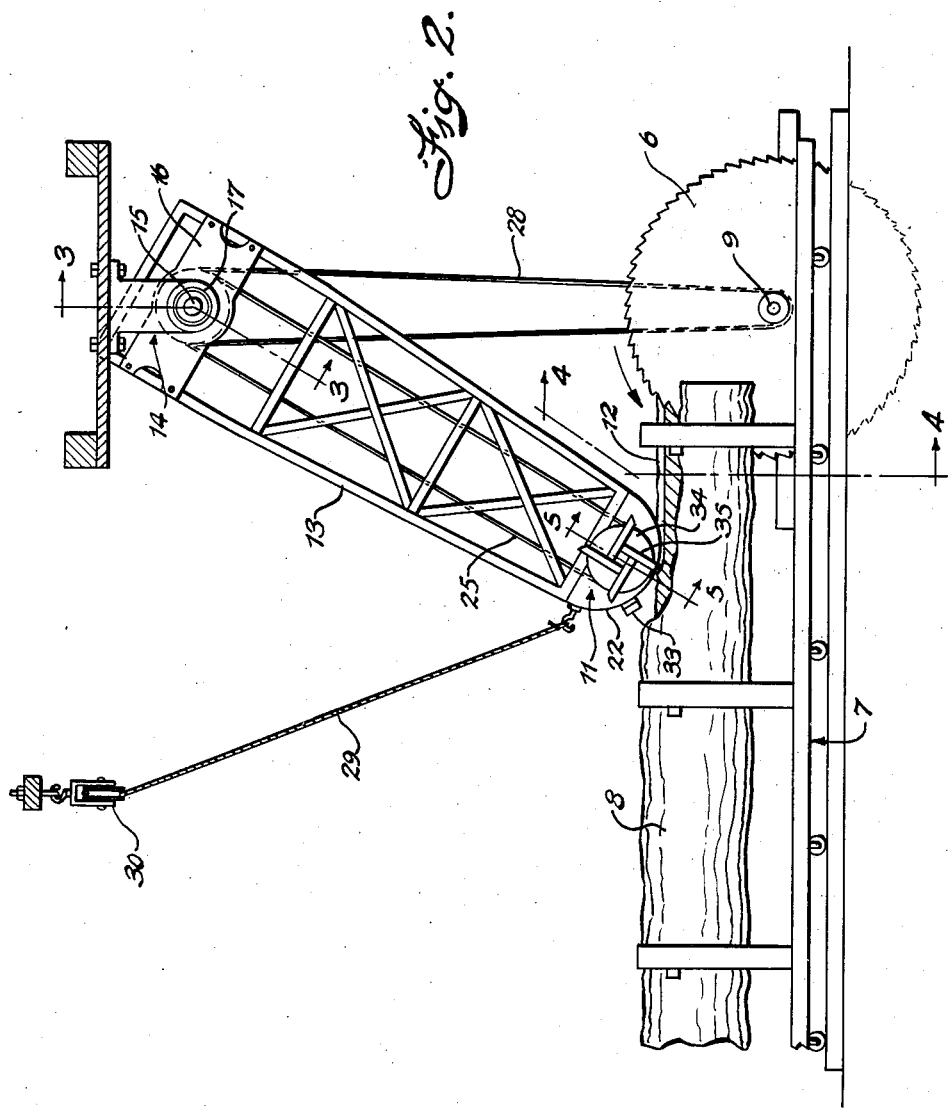
Figure 2 is a vertical section taken on line 2—2 of Figure 1.

It will be noted in Figure 2 that shaft 15 is disposed substantially directly above the shaft 9 and is operatively connected with the latter by means of a belt gearing including pulleys 26 and 27 respectively secured on the shafts 9 and 15 and having a belt 28 passed around the same. Thus, driving of the saw shaft 9 will cause driving of the cutter shaft 20 through the belt gearings described.

As shown in Figure 2, the frame 13 is of such a length that the cutter 11 will be properly disposed to groove the top of the log 8 when the frame 13 is inclined forwardly with said cutter 11 arranged to operate in advance of the saw 6. To facilitate proper adjustment of the frame 13 so that the cutter 11 will form a groove 12 of the desired depth, and in order to facilitate elevation of the frame 13 to an out of the way position, said frame 13 is preferably counter balanced. For this purpose, a cable 29 may be attached at one end to the front of the guard 24 or the lower end of frame 13 and extended forwardly and upwardly over a guide pulley 30 suitably mounted in an elevated position above the shaft 15 in a vertical plane between the sides of frame 13 and forwardly of shaft 15 as shown. The cable 29 is extended laterally from guide pulley 30 over a further guide pulley 31 at the side of the shed 5, and is then extended downwardly where it has a counter weight 32 attached to its other end. In this way, very little manual effort is required to swing the frame, as desired. A suitable handle 33 may be attached to the front of the guard 24 to be grasped for conveniently swinging the frame 13.

The cutter 11 may be of any well known or preferred construction, but is shown as including a suitable head 34 having grooves in the outer side thereof within which are fitted and secured radially adjustable cutter bits 35.

In operation, the saw and routing cutter are driven when pulley 10 is driven, and frame 13 is swung downwardly and rearwardly to the position of Figure 2. The log 8 is then fed toward and past the cutter 11 so as to be grooved at 12 in advance of the saw 6. The log 8 then passes rearwardly to the saw for being cut longitudinally by the latter, the teeth of the saw entering the log where the groove 12 has been formed. In the formation of groove 12, the bark and any adjacent dirt or grit in the bark will have been removed by the cutter 11 so that the same may not cause a rapid dulling and wearing action upon the teeth of the saw. In this way, a considerable expense and amount of time is saved in the operation of a sawmill.

From the foregoing description, it is believed that the construction, operation and advantages of the present invention will be readily understood and appreciated by those skilled in the art. Minor changes may be made in details of construction illustrated and described, such as fall within the scope of the invention as claimed.

What I claim is:

1. A sawmill comprising a driven rotatable horizontal shaft journalled in a fixed position and having a circular saw secured on one end thereof, a log carriage movable horizontally past the saw to feed a log rearwardly and lengthwise to the latter, a plurality of spaced shaft hangers fixedly mounted above said shaft, a second rotatable shaft journalled in said hangers parallel with and in the same vertical plane as the first named shaft, a hollow elongated skeleton frame pivotally suspended at one end from and arranged between adjacent ones of said hangers for swinging about the axis of said second shaft, a rotatable horizontal shaft journalled in the lower end of said frame transversely of the latter and having an end projecting beyond one side of the frame, a routing cutter secured upon the projecting end of the last named shaft in line with said saw and engageable with the log to groove the top of the latter in advance of the saw when the frame is in a slight forwardly inclined position, counterbalancing means connected to the frame for resisting rearward swinging thereof from said inclined position toward the vertical, a belt driving connection between the first and second named shafts at the other side of the frame, and a belt driving connection between the second and third named shafts within the skeleton frame.

2. A sawmill comprising a driven rotatable horizontal shaft journalled in a fixed position and having a circular saw secured on one end thereof, a log carriage movable horizontally past the saw to feed a log rearwardly and lengthwise to the latter, a plurality of spaced shaft hangers fixedly mounted above said shaft, a second rotatable shaft journalled in said hangers parallel with and in the same vertical plane as the first named shaft, a hollow elongated skeleton frame pivotally suspended at one end from and arranged between adjacent ones of said hangers for swinging about the axis of said second shaft, a rotatable horizontal shaft journalled in the lower end of said frame transversely of the latter and having an end projecting beyond one side of the frame, a routing cutter secured upon the projecting end of the last named shaft in line with said saw and engageable with the log to groove the top of the latter in advance of the saw when the frame is in a slight forwardly inclined position, counterbalancing means connected to the frame for resisting rearward swinging thereof from said inclined position toward the vertical, a belt driving connection between the first and second named shafts at the other side of the frame, a belt driving connection between the second and third named shafts within the skeleton frame, a trough-shaped shaft and belt guard secured to and closing the lower end of the skeleton frame, and a handle attached to the front of said guard.

ROBERT A. CRITCHFIELD.

REFERENCES CITED

The following references are of record in the file of this patent:

UNITED STATES PATENTS

| Number | Name | Date |
|---|---|---|
| 25,972 | Littlefield | Nov. 1, 1859 |
| 94,255 | Tompkins | Aug. 31, 1869 |
| 349,356 | Parish | Sept. 21, 1886 |
| 589,004 | Luther | Aug. 31, 1897 |
| 993,541 | Newmaker | May 30, 1911 |
| 1,262,943 | Gustafson | Apr. 16, 1918 |
| 2,181,047 | Collett | Nov. 21, 1939 |